(12) United States Patent
Aoki

(10) Patent No.: US 9,157,760 B2
(45) Date of Patent: Oct. 13, 2015

(54) COMMUNITY MAPPING AND DIRECTION INDICATING

(75) Inventor: Norihiro Edwin Aoki, Sunnyvale, CA (US)

(73) Assignee: AOL Inc., Dulles, VA (US)

(*) Notice: Subject to any disclaimer, the term of this patent is extended or adjusted under 35 U.S.C. 154(b) by 2116 days.

(21) Appl. No.: 12/013,254

(22) Filed: Jan. 11, 2008

(65) Prior Publication Data

US 2008/0189030 A1 Aug. 7, 2008

Related U.S. Application Data

(60) Provisional application No. 60/884,695, filed on Jan. 12, 2007, provisional application No. 60/947,827, filed on Jul. 3, 2007.

(51) Int. Cl.
*G01C 21/34* (2006.01)
*G08G 1/123* (2006.01)
*G01C 21/36* (2006.01)

(52) U.S. Cl.
CPC .................................. *G01C 21/3691* (2013.01)

(58) Field of Classification Search
USPC ......... 701/209, 200, 202, 201, 211, 117, 118, 701/119, 400, 408, 532, 533, 538, 540, 541, 701/204, 208; 340/985, 988, 995.1, 995.12
See application file for complete search history.

(56) References Cited

U.S. PATENT DOCUMENTS

| | | | |
|---|---|---|---|
| 7,183,942 B2 | 2/2007 | Rock et al. | |
| 2004/0203909 A1* | 10/2004 | Koster | 455/456.1 |
| 2004/0260458 A1* | 12/2004 | Park et al. | 701/200 |
| 2005/0043880 A1* | 2/2005 | Yamane et al. | 701/200 |
| 2005/0114014 A1* | 5/2005 | Isaac | 701/204 |
| 2007/0010942 A1* | 1/2007 | Bill | 701/209 |
| 2008/0077309 A1* | 3/2008 | Cobbold | 701/117 |

* cited by examiner

*Primary Examiner* — Ronnie Mancho
(74) *Attorney, Agent, or Firm* — Finnegan, Henderson, Farabow, Garrett & Dunner LLP

(57) ABSTRACT

Enabling a user to perceive map or route information including a status includes enabling a first user to perceive one or more features of a map and receiving condition information that reflects a condition perceived by the first user as existing relative to the one or more features based on input from the first user. Also, enabling a user to perceive map or route information includes receiving a request for a route from a second user and determining a response to the request for the route including the route based on the condition information received from the first user related to the one or more features. Further, enabling a user to perceive map or route information includes enabling the second user to perceive the route based on receipt of the response.

36 Claims, 14 Drawing Sheets

FIG. 5C

COMMUNITY MAPPING AND DIRECTION INDICATING

CROSS-REFERENCE TO RELATED APPLICATIONS

This application claims priority to U.S. Provisional Application Ser. No. 60/884,695, filed on Jan. 12, 2007 and U.S. Provisional Application Ser. No. 60/947,827, filed on Jul. 3, 2007, each of which are incorporated by reference in their entirety.

TECHNICAL FIELD

This disclosure relates to condition information for computer-generated mapping.

BACKGROUND

Computer devices may be used to generate or provide mapping information to users. For example, systems may enable communication with a host to request specific maps or routes which may determine an appropriate route and send the route to a portable computer device or desktop computer.

SUMMARY

In one general aspect, a method for enabling a user to perceive map or route information based on previous user input of conditions of features includes receiving a request for a first route from a first user and determining the first route having one or more features associated therewith. The method also includes enabling a first user to perceive a first route and receiving condition information to be used as a basis for accessing the one or more features associated with the first route from the first user. The method further includes using the condition information received from the first user and condition information received from sources other than the first user to determine one or more statuses of the one or more features and storing the determined one or more statuses. Moreover, the method includes receiving a request for a second route from a second user and determining the second route as including the one or more features associated with the first route. In addition, the method includes accessing the stored one or more statuses of the one or more features and enabling the second user to perceive the second route and the accessed one or more statuses of the one or more features.

In another general aspect, a method for enabling a user to perceive map or route information including a status includes enabling a first user to perceive one or more features of a map and receiving condition information that reflects a condition perceived by the first user as existing relative to the one or more features based on input from the first user. The method also includes receiving a request for a route from a second user and determining a response to the request for the route including the route based on the condition information received from the first user related to the one or more features. Also, the method includes enabling the second user to perceive the route based on receipt of the response.

Implementations may include one or more additional features. For example, determining the response to the request for the route may include determining the route and a status of one or more features associated with the route, and enabling the second user to perceive the route based on receipt of the response may include enabling the second user to perceive the route and the status of the one or more features. Receiving condition information may include receiving information reflective of a prediction of an amount of traffic that will traverse a portion of a road or an intersection at a future time. Also, receiving condition information may include receiving information reflective of an amount of traffic currently traversing a portion of a road or an intersection. Further, receiving condition information may include receiving an update from the first user of an amount of traffic currently traversing a portion of a road or an intersection previously communicated to the first user.

Also, in the method, enabling the second user to perceive the route and the status of the one or more features may include enabling the user to perceive an indication of the source of the received condition information used in determining the response to the request for the route. In addition, enabling the second user to perceive the route and the status of the one or more features may include enabling the user to perceive an indication of the amount of the received condition information used in determining the response to the request for the route. Further, enabling the second user to perceive the route and the status of the one or more features may include enabling the user to perceive one or more icons as associated with one or more features, each icon being associated with a particular status. Moreover, enabling a first user to perceive the map may include enabling a user to perceive a first route including a first feature, and receiving the condition information may include receiving condition information associated with the first feature.

Further, in the method, determining the response to the request for the route may include determining a status of the first feature in response to and after receiving the request for the route, and enabling the second user to perceive the route may include enabling the second user to perceive the route including the first feature and the determined status of the first feature. Determining a status of the first feature in response to and after receiving the request for the route may include determining that the route includes the first feature, and using the received condition information to determine a status of the first feature based on the determination that the route includes the first feature. Also, determining the response to the request for the route may include determining a status of the first feature before receiving the request for the route and accessing the determined status of the first feature in response to receiving the request for the route and enabling the second user to perceive the route may include enabling the second user to perceive the route including the first feature and the determined status of the first feature.

Additionally, in the method, determining a status of the first feature before receiving the request for the route may include using the received condition information to determine a status of the first feature and storing the determined status of the first feature. The method may also include determining that the route includes the first feature and accessing the stored status of first feature based on the determination that the route includes the first feature. Moreover, the method may also include determining whether the first user should be enabled to perceive the stored status of the first feature. Determining whether the first user should be enabled to perceive the stored status of the first feature may include use of user-specific rules. In addition, the method may include enabling the first user to specify options which affect the user-specific rules. Determining the response to the request for the route may include determining whether to include the one or more features within the route based on the condition information received from the first user.

Implementation may include methods, systems, and devices with similar features. Also, implementations of the desired techniques may include hardware or computer software on a computer accessible medium. The details of one or more implementations are set forth in the accompanying drawings and the description below. Other features will be apparent from the description and drawings, and the claims.

DESCRIPTION OF DRAWINGS

FIGS. 5A-5C are exemplary graphical user interfaces including condition information.

Like reference symbols in the various drawings indicate like features.

DETAILED DESCRIPTION

Figure 1:
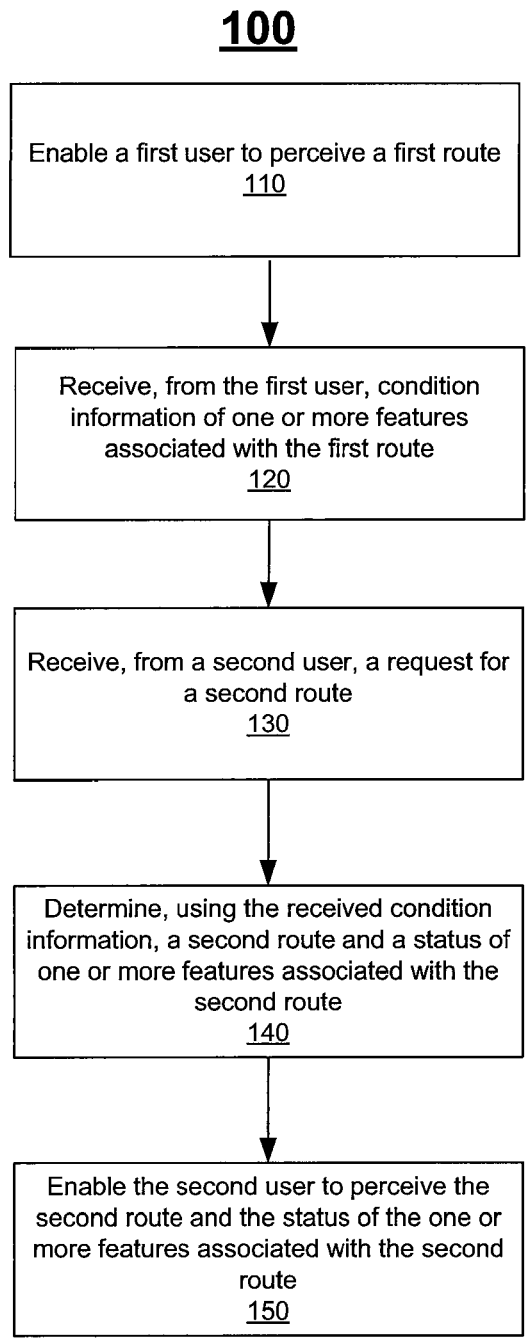
FIG. 1 is a flow chart illustrating an example of a process for sending a route including condition information.

In one particular implementation, a mapping system is configured to deliver map and/or route information to a large number of subscribers, the map and/or route information includes status information (e.g., traffic status, weather status, or information regarding a prediction of status) for various portions of the map/route. The mapping system is configured to determine the status information from condition information received from one or more sources, including from subscriber input of condition information reflective of the conditions of portions of the map/route witnessed by the subscribers while traveling. The mapping system enables the subscribers to select portions of the map/route (e.g., highway 66 between exit 55 and 77) to specify condition information for the selected portions of the map/route. The subscribers may make the specification, for example, at home using a desktop computer or when traversing the map using a routing device. Condition information includes indications of one or more specific conditions (e.g., "heavy traffic" or "rush hour typically from 4-6 pm") of a portion or feature of the map or route.

In one implementation, the condition information may be entered by a user currently experiencing the condition while traversing the portion of feature of the map or route and may be sent to a host. In another implementation, the condition information may be entered as a prediction of general trends and not by a user experiencing the condition. The mapping system uses the subscriber-inputted condition information and optionally condition information from other sources to determine and display to users a status for the corresponding portions of the map/route (e.g., congestion delays on highway 66 between exit 55 and exit 77). In this manner, the mapping system is able to leverage subscriber input to provide and dynamically update status information displayed to subscribers in routes/maps generated by the mapping system. Moreover, the mapping system may be configured to use such status information for determining an optimal route between an origination address and a destination address in response to a subscriber request for directions.

More specifically, a mapping or direction-finding service may include a mechanism by which a user (i.e., a subscriber) may select a feature of a map or a route displayed in, for example, a graphical user interface (GUI). A feature of a map or a route may be a portion or a region of a map of a geographic area or, additionally or alternatively, may be a step in a series of directions (e.g., a step in a route) offered by a direction finding service for traveling across a geographic area. Examples of features include: a road, a portion of a road, an intersection, an on-ramp, an off-ramp, a city, a specific location or region (e.g., Dulles Corridor and the BackBay Area), or other features or points of interest typically illustrated in or designated by a map. The system may enable the user to select or input condition information to be associated with the selected feature. In one implementation, the user selects a road and inputs condition information reflecting the current condition of the road. For example, the condition information may be selected by the user from among multiple predetermined condition options including "light traffic," a "traffic jam," or a "traffic accident." The condition information may be inputted by a user, for example, by inputting a freeform text string or, if selecting from among predetermined condition options, by selecting one or more displayed textual or graphical icons or tags corresponding to different predetermined condition options presented in a GUI.

By enabling user input of condition information, the potential pool of information for a system to determine statuses of features is increased beyond that of available automated systems to possibly include any vehicle along a road. Also, users are enabled to update or correct information that is wrong or outdated. For example, if a user of a system stuck in traffic receives a status that the road is traffic free, a user may be enabled to correct the erroneous status through inputting condition information of "traffic deadlock." This input may update the user's GUI as well as facilitate the transmission of correct statuses to other users. Also, user's of condition information may use "buddy lists" (e.g., of AOL Instant Messenger) or other user groups to share condition information only with a subset of users. For example, a group of friends may wish to receive statuses based only on condition information received from the group of friends.

The mapping system uses condition information inputted by users and/or received from other sources (e.g., traffic reports received from a data feed) to determine statuses of features. A status of a feature is the condition, state, or a prediction or general trend of the condition or state of a feature. The feature may be accepted by the mapping system for display to one or more users and determined by the mapping system by applying predetermined rules to received condition information. A status of a feature may be displayed, for example, in a displayed map and/or a displayed set of directions as text, a graphical icon, and/or a graphical tag that is in close proximity to, references, or is otherwise associated with the feature.

The rules that the mapping system applies to received condition information to determine status information of features (i.e., status generation rules) may be global and/or may be user-specific. Global rules determine statuses of features for all or for a subset of users in the subscriber base while user-specific rules determine statuses of features for only a single user. User-specific rules are typically specified by or for a single user. If global and/or user-specific rules conflict, the system may select which rules govern based on preferences of individual users and/or based on prioritization schemes set forth by the system (e.g., user-specific rules specified by a user always take precedence over global rules). Alternatively or additionally, multiple statuses may be shown, each corresponding to a different rule applicable to the feature (e.g., a status determined from a user-specific rule may be designated by "U" while a status determined from a global rule that is different from that designated by the user-specific rule may be designated by "G").

An exemplary user-specific status generation rule may be: if I submit a condition for a feature, the status assigned to the feature and displayed to me in a route or map should always match the condition of the feature I submitted. To illustrate, a particular user may submit condition information indicating that a road has "heavy traffic." The mapping system may receive that condition information and may assign a status of "heavy traffic" to that road and may display that status when displaying a map or a route that includes that road to the particular user. The status of "heavy traffic", however, may not be assigned to that road or displayed for that road in maps or routes displayed by the mapping system to other users. The status generation rule, therefore, is user-specific.

Another example of a user specific status generation rule may be: if one of my buddies on my buddy list submits a condition for a feature, the status assigned to the feature and displayed to me should match the condition of the feature submitted by my buddy. To illustrate, if my buddy submits (manually or otherwise) condition information indicating heavy traffic on road X, I perceive the same, irrespective of or notwithstanding (and potentially in addition to) condition information for that road that is submitted by other users or buddies of mine. This could be applied to other classes or groups of users that I specify (e.g., people I know, users on a buddy list of an Instant Message program, users associated with another online group, users associated with another Internet social network, etc.).

Moreover, an exemplary global status generation rule may be: if more than ten users submit condition information within a predetermined window of time (e.g., 5 minutes) indicating the same condition (e.g., "heavy traffic") for a feature (e.g., road), then the status of the feature should be changed to match that condition for all (or for a predetermined subset) users. This threshold number of ten users may change depending on how many users are currently accessing and viewing a map/route that includes that feature and/or the number of users that are determined to be traversing that feature via location detection during the window of time. Alternatively or additionally, a percentage of users rather than a threshold number may be used. For example, if more than 5% of users viewing the road in a map/route or traversing the road within a five minute interval submit condition information indicating heavy traffic, then assign the road the status of "heavy traffic" for all users. Other rules may generate statuses for features that are a combination of the different conditions received from users and from other sources. For example, if five users submit that a road has "light traffic" and five users submit that a road has "heavy traffic," than an included status generation rule in the mapping system may assign the status "moderate traffic" to the road. Notably, the rules discussed above and below may be default rules and/or may be manually established or overridden through, for example, selection of user-selected options as described below.

Referring to FIG. 1, a flow chart illustrates an example of a process 100 for sending a route including status information. In the process 100, a host receives condition information from a first user and a request for a route from a second user. In response, the host calculates and delivers the route to the user and may also deliver statuses of one or more features of the route to the second user.

The process 100 begins when a first user is enabled to perceive a first route (110). The first route may be sent in response to receipt of a request for the route from the first user. Also, the first route may include one or more features, such as, roads, portions of roads, intersections, on-ramps or off-ramps, points of interest, cities, or other specific locations or regions.

Condition information of one or more features associated with the first route is received from the first user (120). Specifically, after receiving the first route, the first user's client system may render the route and may enable the user to indicate a condition of one or more features on the route. The condition may indicate a current condition of traffic, traffic movement, congestion or delay, weather, detour or road blockage, or other conditions. The condition information may be stored and accessed in response to other requests. A request for a second route is received from a second user (130). The second user may be a different individual than the first user and may be accessing a different client system than the first user's client system. Also, the second route may include a different origin and destination than the first route.

A second route and a status of one more features associated with the second route are determined using the received condition information (140). In one implementation, after receiving the request, the second route is initially determined. Thereafter, using the determined second route, a stored status or condition information for features in the determined second route is accessed. In another implementation, after receiving the request for a second route, stored condition information or statuses are accessed. Thereafter, the second route is determined using the status or condition information.

The second user is enabled to perceive the second route and the status of the one more features associated with the second route (150). In one implementation, the status sent to the second user is the same as the condition information received from the first user. Alternatively, in another implementation, a different status is sent to the second user, where the different status is generalized, weighed, or averaged based on receipt (or lack thereof) of condition information from various users. For example, if the first user's condition information specifies "heavy traffic" for a feature, and another user's condition information specifies "light traffic" for the same feature, a status of "moderate traffic" may be sent to the second user.

Figure 2:
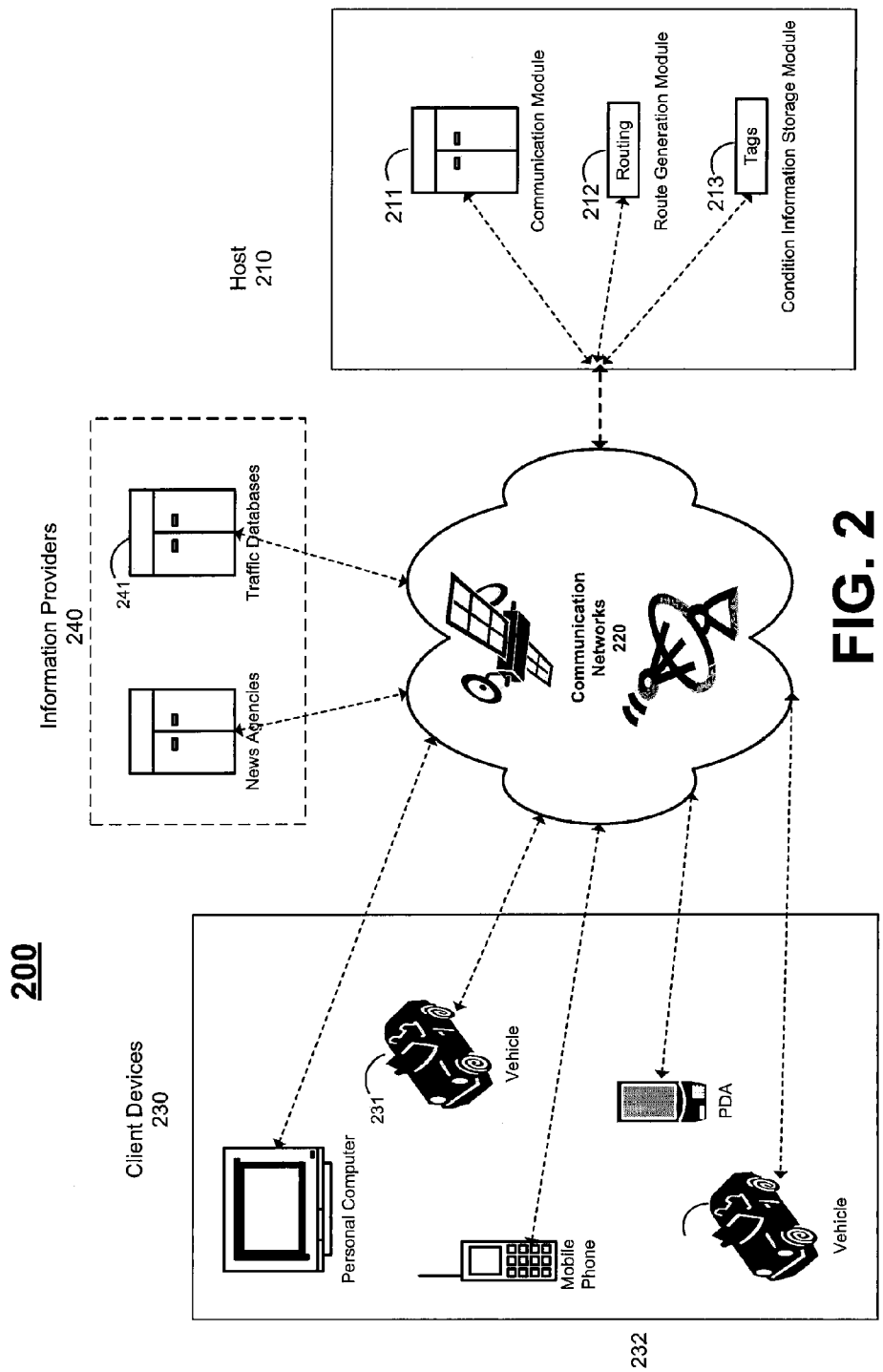
FIG. 2 is a block diagram illustrating an example of a system for delivering mapping information including condition information.

Referring to FIG. 2, a system 200 for delivering mapping information including status information includes a host 210, communication networks 220, client devices 230, and information providers 240. In the system 200, the host 210 receives requests for mapping information and status information from the client devices 230 through the communication networks 220. The host also may receive condition information from the information providers 240 through the communication networks 220. The host 210 uses the received condition information when determining and/or delivering mapping information and status information to the client devices 230.

Each of the client devices 230, the information providers 240, and the host 210 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client devices 230 and the information providers 240 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client devices 230 or the host 210.

The client devices 230 and the information providers 240 may include one or more devices capable of accessing, sending, or receiving content from the host 210. The client devices 230 may include a general-purpose computer (e.g., a personal computer ("PC")) capable of responding to and executing instructions in a defined manner, a workstation, a notebook computer, a Personal Digital Assistant ("PDA"), a wireless phone, a vehicle navigation system, a component, other equipment, or some combination of these items that is capable of responding to and executing instructions.

In one implementation, the client devices 230 include one or more information retrieval software applications (e.g., a browser, a mail application, an instant messaging client, an Internet service provider client, a media player, a mobile location based services client, a mobile mapping and/or navigation client, or routing application, or other integrated client) capable of receiving one or more data units. The information retrieval applications run on a general-purpose operating system and a hardware platform that includes a general-purpose processor and specialized hardware for graphics, communications and/or other capabilities. In another implementation, the client devices 230 includes a wireless telephone running a micro-browser application on a reduced operating system with general purpose and specialized hardware capable of operating in mobile environments.

The client devices 230 may be configured to enable users to enter requests for map or route information. The client devices 230 also may be configured to enable users to enter condition information regarding features of a map or route. The condition information may be sent to the host 210. The client devices 230 may further be configured to receive and render condition information and status information, along with map or route information.

The communication networks 220 include hardware and/or software capable of enabling direct or indirect communications between the client devices 230 and the host 210.

As such, the communication networks 220 may include a direct link between the client devices 230 and the host 210, or it may include one or more networks or subnetworks between them (not shown). Each network or subnetwork includes, for example, a wired or wireless data pathway capable of carrying and receiving data. Examples of the delivery network include the Internet, the World Wide Web, a Wide Area Network ("WAN"), a Local Area Network ("LAN"), analog or digital wired and wireless telephone networks, radio, television, cable, satellite, and/or any other delivery mechanism for carrying data.

The host 210 and the information providers 240 includes a general-purpose computer having a central processor unit (CPU), and memory/storage devices that store data and various programs such as an operating system and one or more application programs. Other examples of the host 210 and the information providers 240 include a workstation, a server, a special purpose device or component, a broadcast system, other equipment, or some combination thereof capable of responding to and executing instructions in a defined manner.

The host 210 may include a host operated by an Online Service Provider that provides mapping or routing services to subscribers. The host 210 may be configured to provide navigation services. In one example, the host 210 is configured to generate maps and route information regarding locations, travel time, distance to the appointment location, and other information. The host 210 may be configured to enable selection of different types of directions. For example, the host 210 may be configured to enable turn-by-turn voice guided navigation, mapping directions, text directions, and/or "other" types of directions, such as walking directions or public transportation directions. The host 210 may be configured to send this information to the client devices 230 such as, for example, a user's mobile device, the user's automobile, and/or the user's computer.

The host 210 also may be configured to receive condition information regarding features of a map or route. For example, the host 210 may be configured to receive condition information entered at the client device 230 using a communications module 211 or condition information from information providers 240. The host 210 may be configured to store the condition information in a condition information storage module 213 and may determine, based on the condition information, a status of a feature. When determining a map or route information using the route generation module 212, the host 210 may access stored condition information or statuses for features from the condition information storage module 213. Also, when delivering subsequent map or route information generated by the route generation storage module 212, the host 210 may include statuses of features included in the map or route.

The information providers 240 may include third party databases accessible by the host 210. For example, the information providers 240 may include database information maintained or supplemented by a news agency, transportation agency, other news gathering group, sensor data, or other information providers. The information providers 240 may be similar configured to provide condition information as provided by the client devices 230. Alternatively, the information providers 240 are not configured similarly to the client devices 230, and instead, provide raw data. More specifically, in one implementation, a traffic database 241 intermittently feeds specific information such as speed of traffic to the host 241. The host 210 uses the traffic information to determine condition information or statuses for features.

In one implementation, the client devices 230 alone may perform various functions described above. For example, the client devices 230 may perform the functions described above by referencing an internal navigation application. In another implementation, the host 210 alone may perform the functions described above. For example, the host 210 may perform the functions described above by referencing a host navigation application. In yet another implementation, the client devices 230 and the host 210 both may perform some or all of the functions described above. For example, a client device 230 may include a vehicle navigation system that performs routing, and a host 210 may deliver mapping information and condition information. Specifically, the client device 230 may include mapping information for a given region when generating a route. The host 210 may send the mapping information, such as the features of an area, including condition information of one or more features. The client device 230 may then, at the vehicle navigation system, calculate a route and status information using the received mapping information and condition information.

Figure 3:
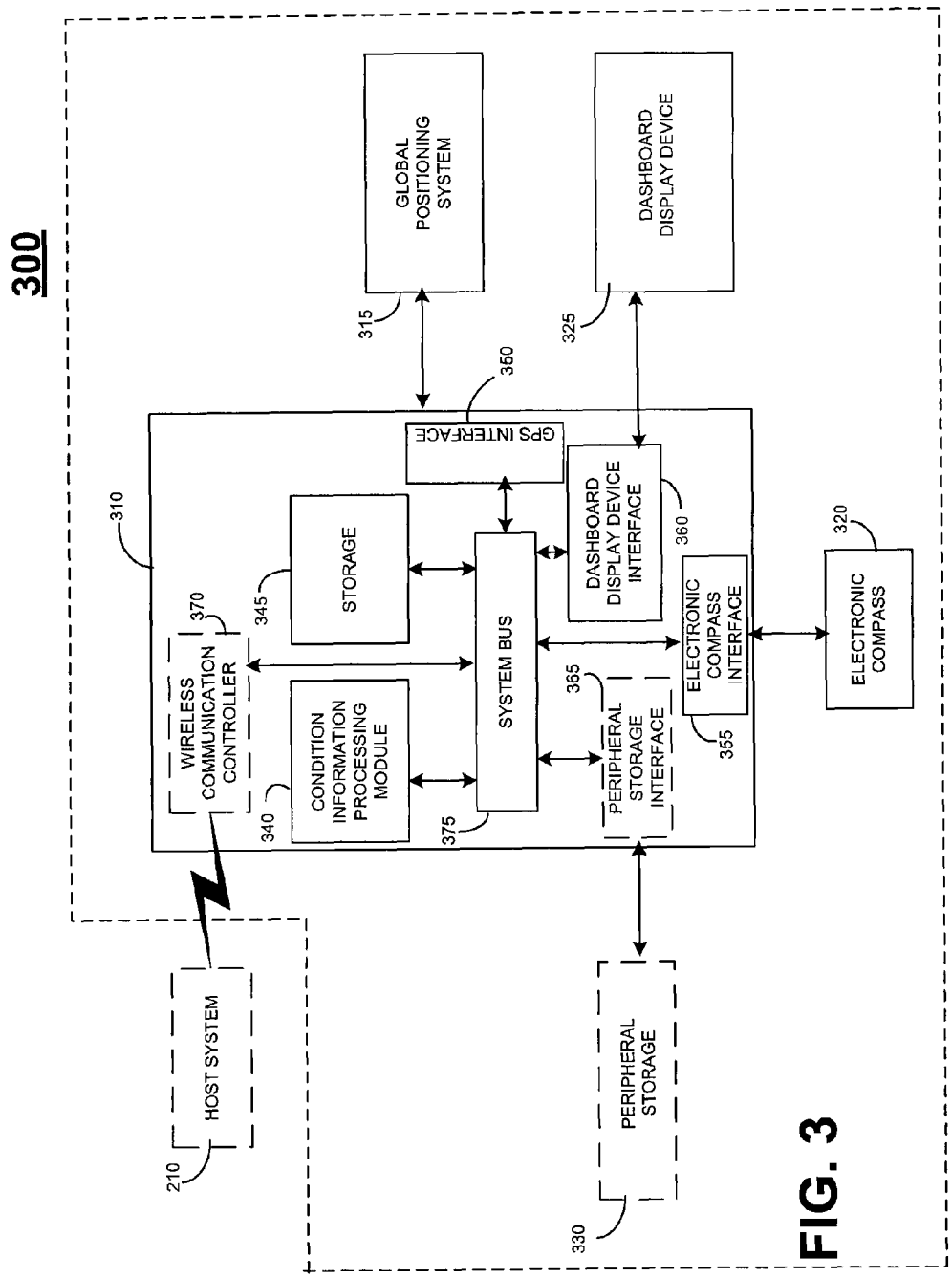
FIG. 3 is a block diagram illustrating an example of a client device for receiving condition information from a user and a host.

Referring to FIG. 3, the client device 231 may receive condition information from a user and status information from the host 210. The client device 231 may be a specific exemplary implementation of the client device 230 discussed with respect to FIG. 2. The host 210 may be a specific exemplary implementation of the host 210 discussed with respect to FIG. 2.

The client device 231 may include a map display system 310, a global positioning system (GPS) 315, an electronic compass 320, and a dashboard display device 325. The client device 231 also may include a peripheral storage device 330 and may communicate with the host 210. The map display system 310, the GPS 315, the electronic compass 320, the dashboard display device 325, and the peripheral storage device 330 may be physically located in a single system, such as, for example, in a vehicle traveling a route.

The map display system 310 includes a condition/status information processing module 340, a storage unit 345, a GPS interface 350, an electronic compass interface 355, a dashboard display device interface 360, an optional peripheral storage interface 365, a wireless communication controller 370, and a system bus 375. The condition/status information processing module 340 is a central processing unit (CPU) that processes executable instructions. The storage unit 345 stores executable instructions and data.

The dashboard display device 325 may include a screen for rendering map or route information, status information, and condition information. The dashboard display device 325 may include input controls configured to enable the user to input selection information and other information. For example, the dashboard display device 325 may include one or more of buttons, keys, a mouse, or a keyboard.

The wireless communication controller 370 is capable of exchanging wireless communications with the host 210 through a wireless communications pathway. The wireless communication controller 370 only may be necessary when the map display system 310 includes a host. The system bus 375 provides a series of parallel connections to allow communication between the condition/status information processing module 340, the storage unit 345, the GPS interface 350, the electronic compass interface 355, the dashboard display device interface 360, the peripheral storage interface 365, and the wireless communication controller 370.

The condition/status information processing module 340 is configured to receive input of condition information from a user, to send condition information to the host 210, to receive status information from the host 210, and to enable rendering of condition and status information. In particular, the condition/status information processing module 340 may communicate with the dashboard display device 325 through the dashboard display device interface 360 to render input options for condition and status information.

In one implementation, the input option may be available icons that the user may select. An icon may include a simple text string or icon indicating a condition. For example, an icon may include "traffic deadlock" or may be in the shape of a stop sign. In another implementation, a user may select a rendered feature and type-in condition information. The icons may be stored locally using the peripheral storage 330, on the host 210, or both. The icons may be stored as associated with specific coordinates or features of a map, with a route, or with steps or features within a route.

The condition/status information processing module 340 may send condition information received from the user to the host 210 using the wireless communication controller 370 and system bus 375. Sending input condition information may include sending an input text string, a selected tag, or an identifier corresponding to the selected tag along with a selected feature or an identifier corresponding to the selected feature.

Also, the condition/status information processing module 340 may receive status information from the host 210 using the wireless communication controller 370 and system bus 375. The status information may be received along with or separate from receipt of map or route information. For example, in one implementation, the status information is received along with route or map information and updates to the status information are received afterwards. Receiving status information may include receiving a text string, a tag, or an identifier corresponding to the tag along with a feature or an identifier corresponding to the feature. In some implementations, the functions performed by the condition/status information processing module 340 may be performed by a processor that also performs other functions, such as a processor associated with an on-board navigation guidance system.

Figure 4:
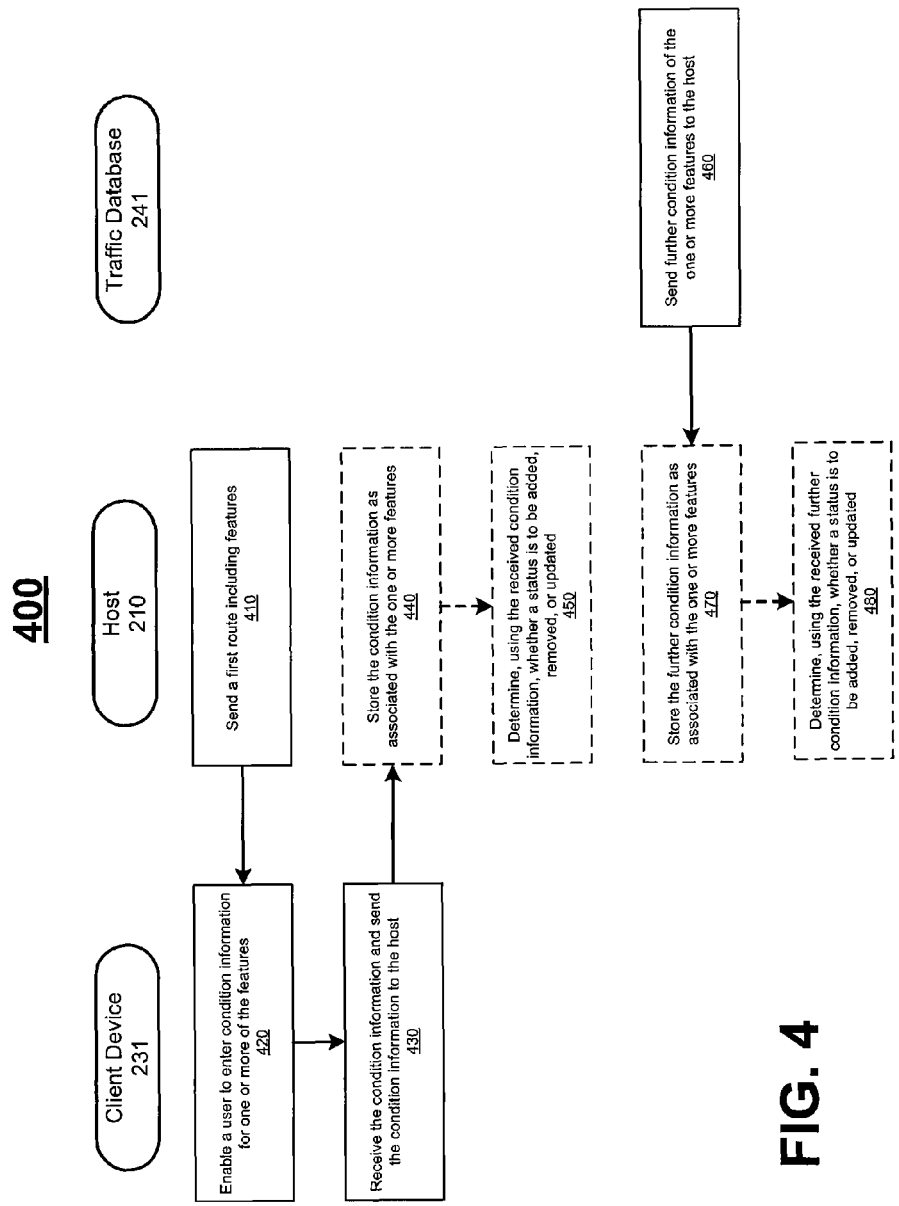
FIG. 4 is a flow chart illustrating an example of a process for receiving condition information.

Referring to FIG. 4, a process 400 for receiving condition information may be used, for example, with the devices and systems of FIGS. 2 and 3. The process 400 exemplifies two sources of condition information received by the host 210—condition information received from input by a user of client device 231 and condition information received from a traffic database 241.

Figure 5A:
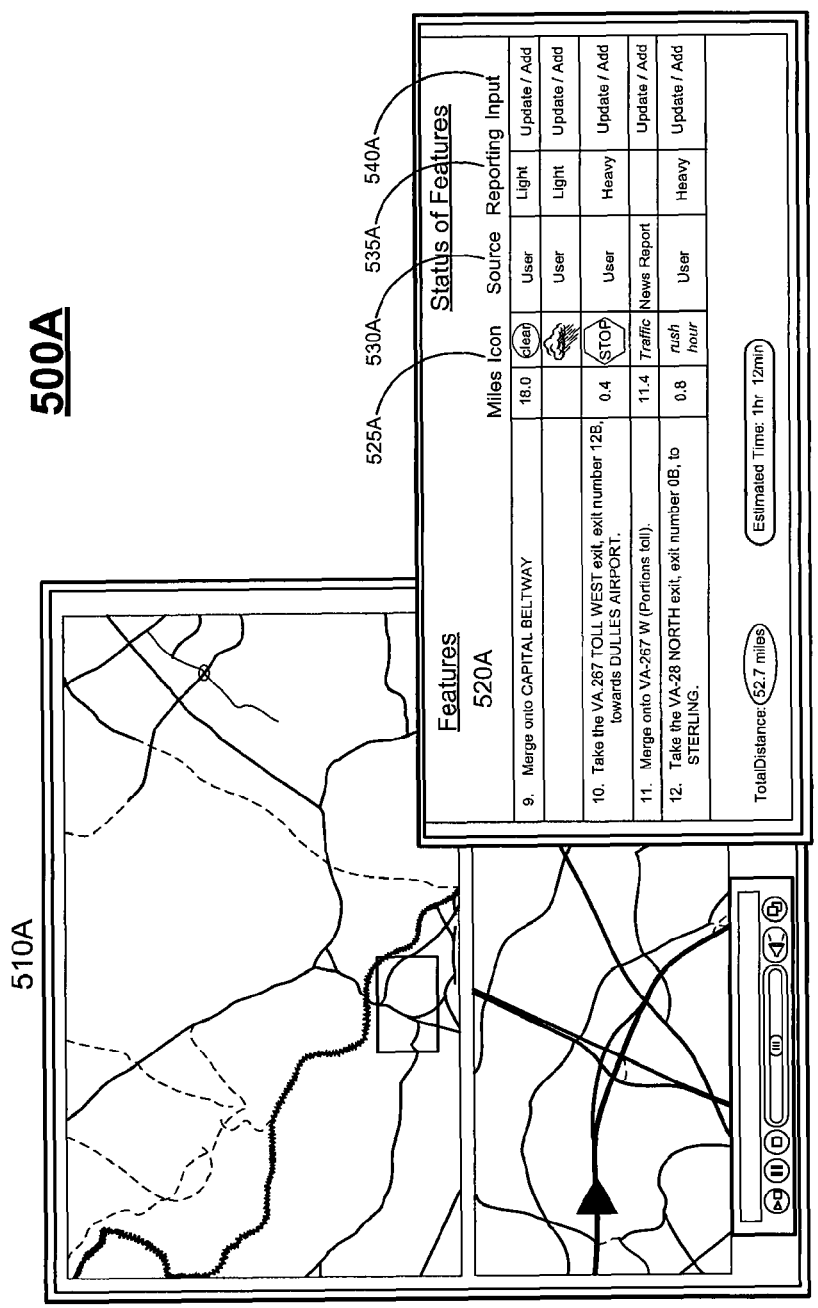

A first route including features is sent from a host 210 to a client device 231 (410). The client device 231 receives the first route, and enables the user to enter condition information for one or more of the features in the first route (420). The user may be enabled to enter condition information through use of the exemplary GUIs 500A-500C of FIGS. 5A-5C. The content of the GUIs 500A-500C is exemplary only and may include different or additional aspects. As shown in FIG. 5A, GUI 500A includes a map or route 510A and associated features 520A. The GUI 500A also includes an icon 525A detailing a status for a feature 525A, a source of the status 530A, reporting information 535A, and an option to input condition information 540A.

The icon 525A may be the status or an indication of a status received by the host 210. In some implementations, the icon 525A may correspond to condition information input through the option to input condition information 540A on the same client device 231 or on other client devices. As shown for icon 525A multiple icons may be displayed for a single feature (e.g., an icon representing light traffic and another icon representing heavy rain may both be displayed for the same feature). The source of the status 530A indicates where the host 210 received the information, and may specify, for example, users, news reporting, traffic cameras, or other sources. The reporting information 535A may specify the amount of users reporting, if applicable (e.g., a total number, percent, or categorized amount as shown). The reporting information 535A also may specify other information corresponding to the reliability of the icon 525A, such as, for example, the time elapsed since the host 210 last received condition information (or other data) used to generate the icon 525A. The option to input condition information 540A enables the user to specify condition information used to update the status of a feature 520A.

The client device 231 then receives the condition information and sends the condition information to the host 210 (430). The client device may receive the condition information through user interaction with GUI 500B of FIG. 5B or GUI 500C of 5C. For example, if the user clicks "add," GUI 500B may be shown enabling selection of the various available icons. An icon corresponds to a specific type or category of condition information and is used to enable ease of user input. GUI 500B includes a "Traffic" icon 552B, a "Weather" icon 554B, an "Other" icon 556B, and a "Manual Entry" icon 556. The listing of available icons is exemplary, and other types or categories may be used. Also, if the user clicks "update," GUI 500C may be shown enabling updating of a currently displayed icon. GUI 500C includes a "Current Status" icon 562C which enables a user to update the condition information of the icon 525A displayed for a feature 525A. The available selections for the "Current Status" icon 562C are specific to the type of icon 525A displayed (e.g., traffic, weather, etc.). The "New Status" icon 564C enables a user to add condition information not related to a displayed icon 525A. The icons may include sub-options. For example, when selecting a "traffic jam" icon, the GUI 500B may prompt the user to enter a time of starting and ending of the jam and whether the jam is reoccurring.

Figure 5B:
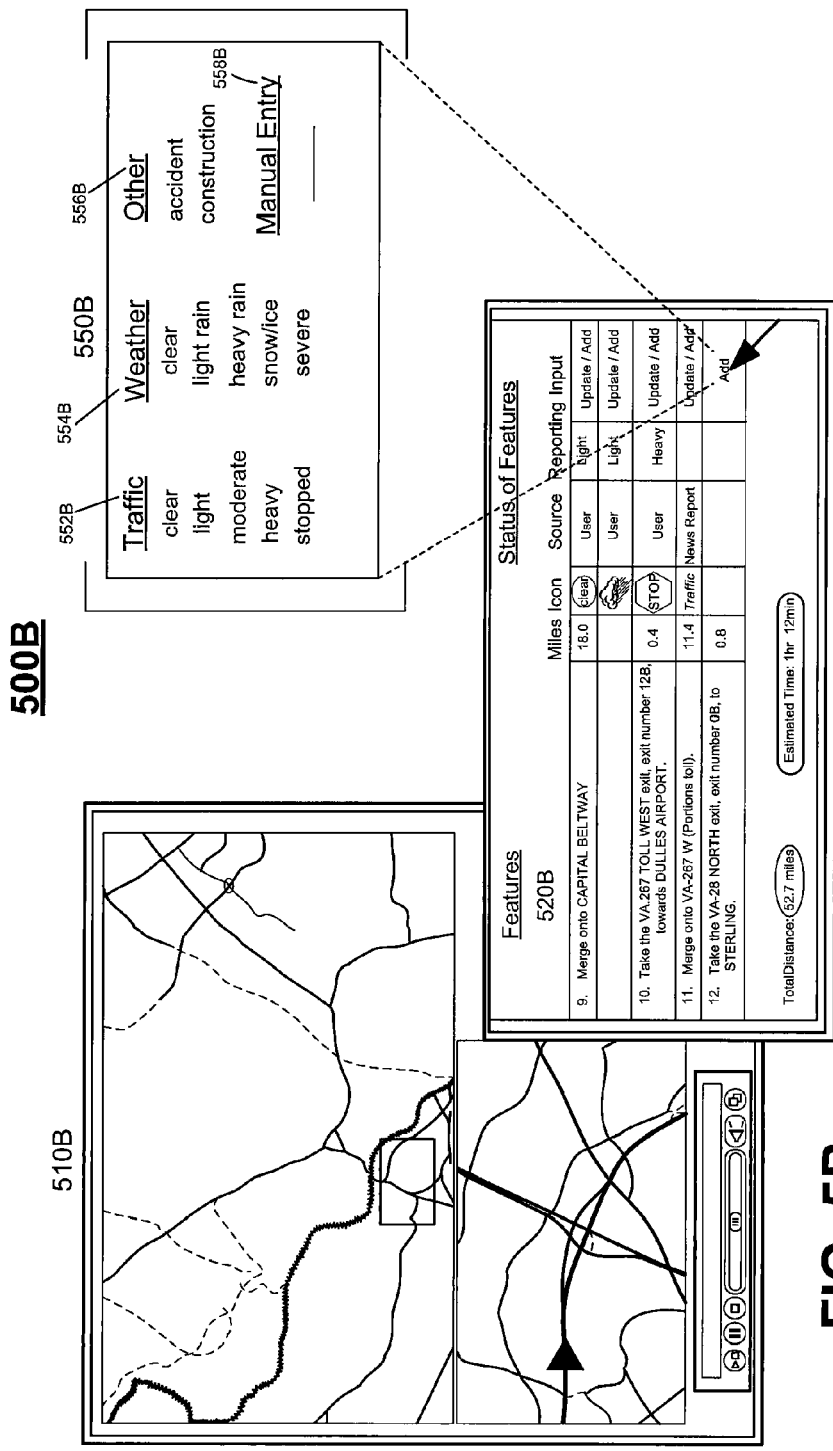
Figure 5C:
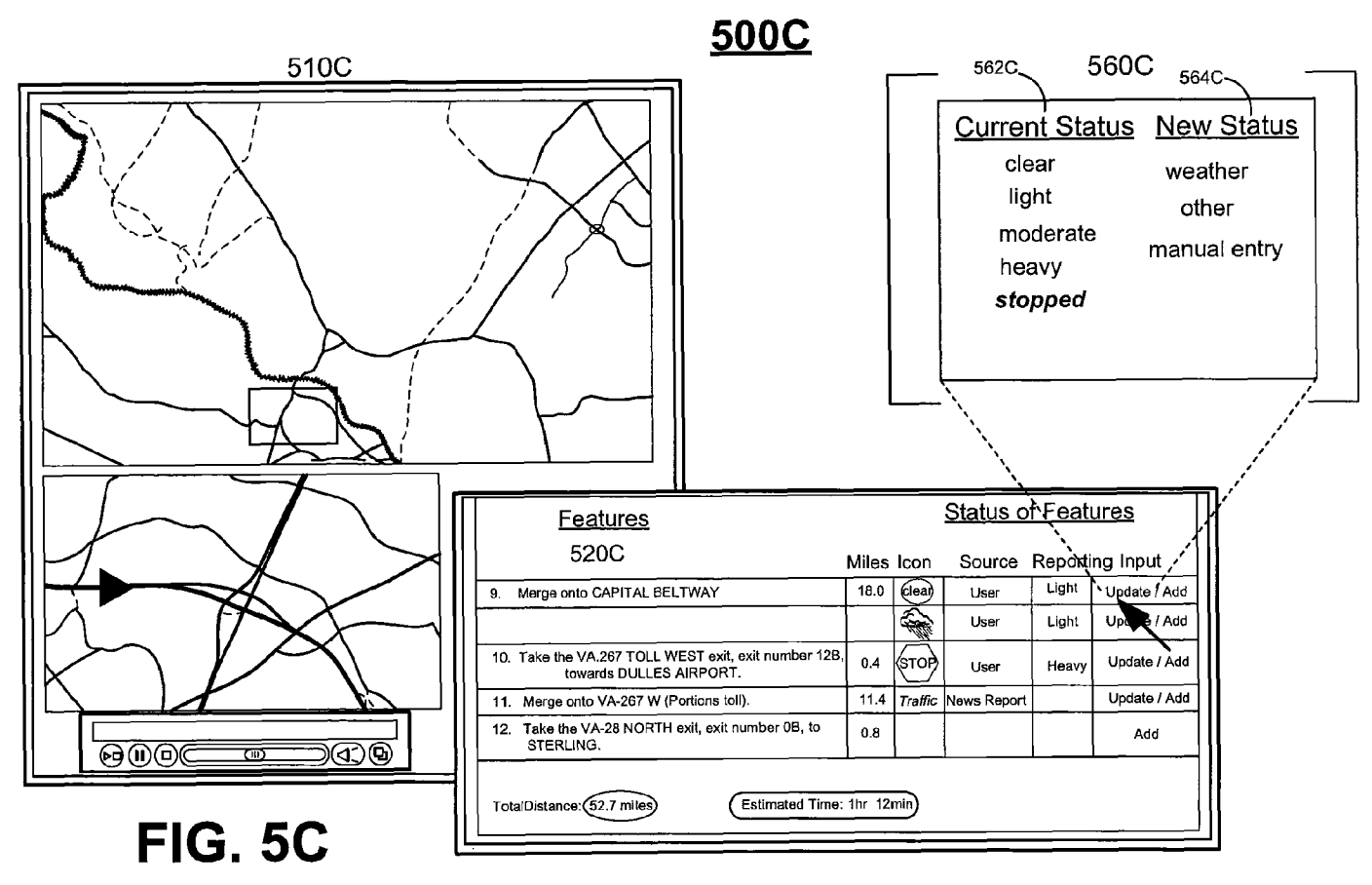

While FIGS. 5A-5C are described with respect to the process 400 of FIG. 4, this context is only an example implementation. The GUIs 500A-500C may be, for example, rendered to a user at a computer outside of the context of requesting a route. More specifically, a user at a desktop computer may be shown the map 510A and, after interacting with the map 510A, elements 520A-540A may also be shown to the user. Further, the user at the desktop may receive reporting information indicative of trends rather than reporting information indicative of current conditions. For example, the icon 525A may reflect a time period or severity of rush hour traffic rather than an indication of a current traffic level.

Moreover, the configuration of the features 520A-520C shown are also exemplary, and other or additional elements may be included in the features 520A-520C. For example, reporting information 535A may include an indication of a window of time in which the information is pertinent or reliable. Moreover, the reporting information 535A may include a timestamp indicating the time of receipt of associated condition information. As such, the window of time or the timestamp may be stored and used by the host similar to the storage and use of condition and/or status information as described in the process 400 of FIG. 4.

Receiving the condition information may trigger the host 210 to store the received information, to use the received condition information to revise status, or both. Specifically, after receiving the condition information, the host 210 may store the condition information as associated with the one or more features (440). Storing the condition information may include adding an entry in a condition information storage module 213 detailing the received condition information and parameters about its receipt, such as, for example, time sent, time received, tags received, and the authoring entity. Thereafter, the host may access data stored in the condition information storage module 231 when determining a route or when sending a route to a client device.

After or alternative to storing the condition information (430), the host 210 may revise a status by using the condition information to determine whether to add, remove, or update a status (450). The status may be used to simplify and minimize processing where a large number of users send a large amount of condition information. In particular, the processing of determining whether to use condition information for routing may be lessened by categorizing a number of indications as a single status. For example, if a number of client devices send indications of a road (i.e., a feature) ranging from "moderate traffic" to "stopped traffic" the host 210 may determine a status of the road as "heavy traffic," and store the status as associated with the road in step 450. In the above techniques, the system may reference the stored status instead of the stored condition information, for a given feature. Various logic may be used to determine whether received condition information adds, updates, or removes a status. For example, based on status generation rules, a status may be added, updated, or removed if a threshold number of same or similar condition information is received within a threshold amount of time, if a threshold percent of same or similar indications are sent from client devices who have been sent map or route information including the relevant features within a threshold of time, if the indications are sent from particular users or a particular category of users, or through use of other considerations.

Revising a status also may include generalizing, weighing, or averaging condition information received from one or more users. For example, in one implementation, the host 210 uses a weighted average formula to revise status, where more recently received condition information is given greater weight in the revision. Also, in one implementation, if the host 210 determines to update an existing status, the host 210 sends updates to client devices recently sent the previous status or a route including the feature corresponding to the previous status. Different implementations may determine or revise statuses at different times. Specifically, the host may 210 access condition information when determining a route (see FIGS. 8A and 9A) such as, for example, to enable user of user-specific status generation rules, and may not rely upon revising statuses at the time condition information is received. In other implementations, the host 210 may access statuses when determining a route (see FIGS. 8B and 9B), and thus, may not rely upon storing condition information as the condition information is received, but rather, may rely upon revising statuses as the condition information is received.

The traffic database 241 sends further condition information of the one or more features to the host 210 (460). The further condition information may be similar in format or content to the condition information provided by the client device 231. Alternatively, the further condition information may be data, such as the speed of traffic. After receiving the further condition information, the host 210 may store the further condition information as associated with the one or more features (470). After or as an alternative to storing the further condition information (470), the host 210 may revise a status by using the further condition information to determine whether to add, remove, or update a status (480). The steps taken by the host 210 after receipt of condition information by the client device 231 (440 and 450) may by similar to the steps taken by the host 210 after receipt of further condition information by the traffic database 241 (470 and 480). In implementations where the traffic database 241 sends data dissimilar to the condition information sent by the client device 231, the host 210 may take an additional step of analyzing the data to determine appropriate condition information. For example, the host may determine that data showing traffic speed for a feature is 0 miles per hour requires condition information of "dead-locked" traffic for the feature.

Figure 6:
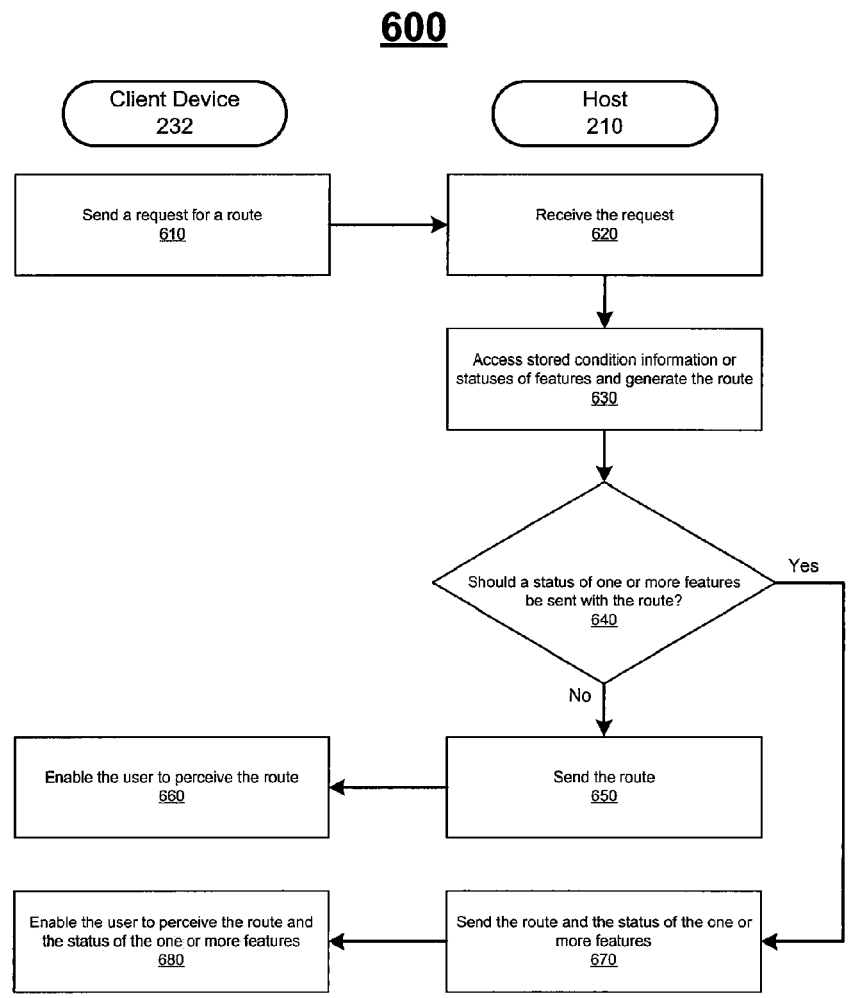
FIG. 6 is a flow chart illustrating an example of a process for enabling a user to perceive a route determined based on condition information.

Referring to FIG. 6, a process 600 for enabling a user to perceive status information exemplifies a situation where the host 210 provides status information to a client device along with a requested route. The process 600 may occur after part or all of the operations of process 400 shown with respect to FIG. 4 are carried out. Further, the process 600 may be used with the devices and systems of FIGS. 2 and 3.

The process 600 begins when the client device 232 sends a request for a route to the host 210 (610). The host 210 receives the request (620), and in response, accesses stored condition information or statuses of features and generates the route (630). The host 210 may access the condition information stored with respect to steps 440 and 470 and/or the statuses with respect to steps 450 and 480. As described in further detail in FIGS. 9A and 9B, the condition information or statuses may be accessed prior to generating the route and may effect the determination of the route.

Figure 8A:
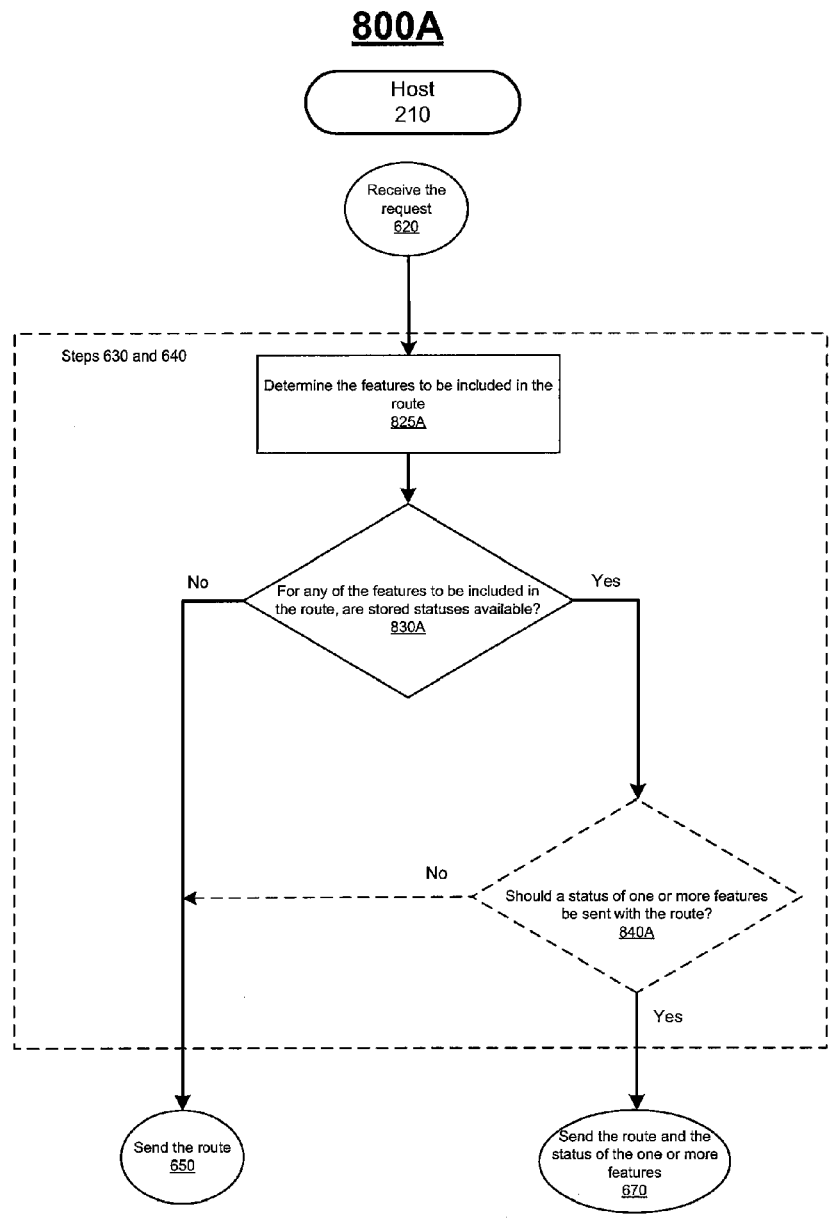
FIGS. 8A-8B are flow charts illustrating examples of processes that access condition information after determining features in a route.
Figure 8B:
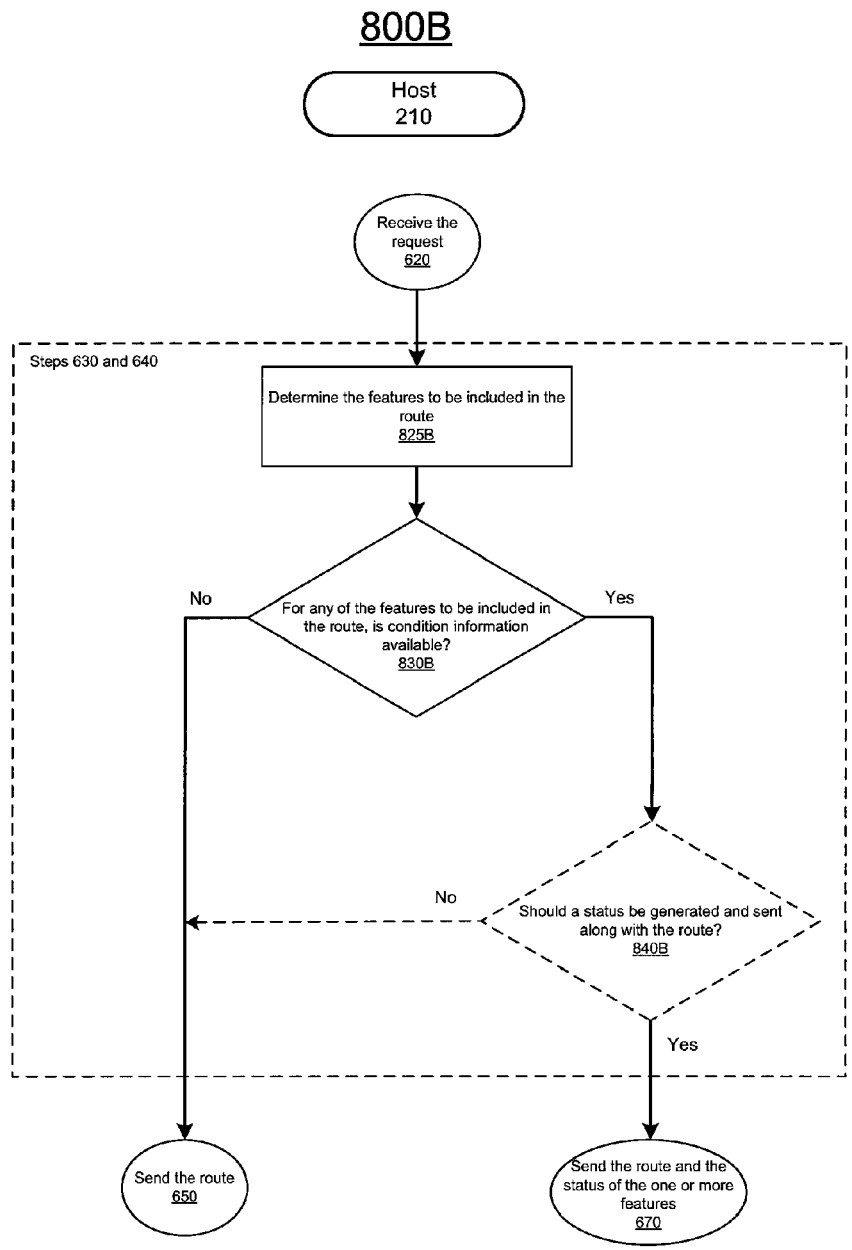
Figure 9A:
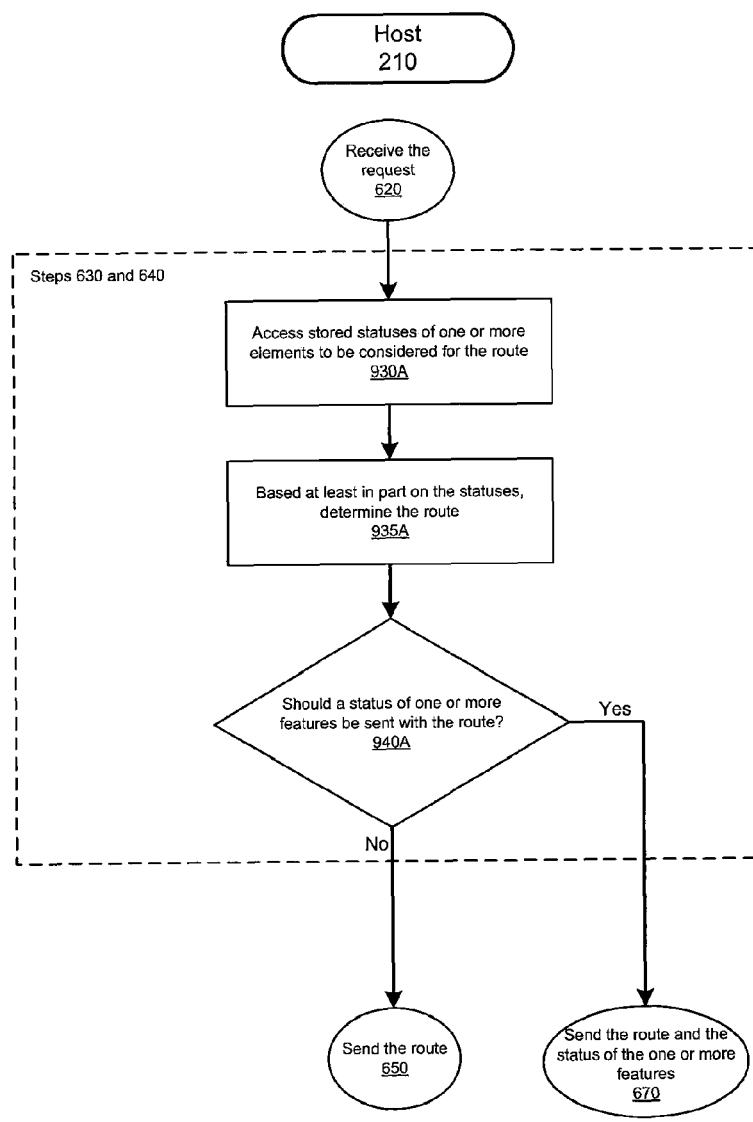
FIGS. 9A-9B are flow charts illustrating examples of processes that access condition information before determining features in a route.
Figure 9B:
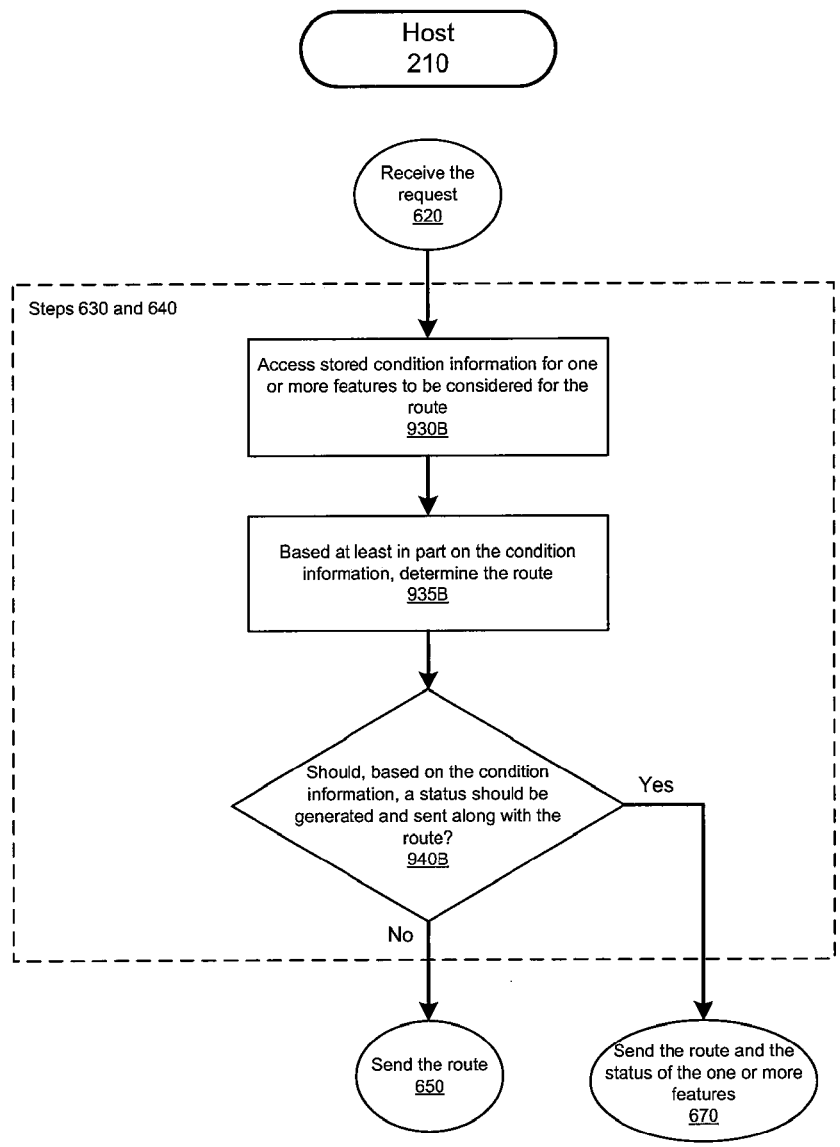

In various implementations, the system considers the condition information or statuses when generating a route as illustrated by FIGS. 9A and 9B. These implementations enable flexibility in that the initial routing is affected by the stored condition information or statuses and may take into account route generation rules as discussed with respect to FIG. 9A. For example, if accessed condition information and/or status for a feature corresponds to "stopped traffic", the host 210 may, based on the accessed condition information or status, determine a route that does not include the feature for some or all of the client devices. Alternatively, the condition information or statuses may be accessed after generating the route as illustrated by FIGS. 8A and 8B. These implementations enable simplicity in processing in that routing can initially be calculated without consideration of condition information and statuses, and only condition information and features associated with a route need be considered. For example, after generating a requested route, the host 210 may access condition information or a status corresponding to features in a route, and thus, consider "stopped traffic" for a feature determined to be in a route. The system may automatically create a revised route that does not include the feature having a status of "stopped traffic." Additionally or alternatively, the system may consider user or client specific options to determine whether to create a new route and/or may query the user as to whether he/she wishes to create new route that does not include the feature.

The host 210 determines whether a status of one or more features should be sent with the route (640). In one implementation, determining whether a status of one or more features should be sent consists of determining whether a status is available for the one or more features. In other implementations, determining whether a status of one or more features should be sent includes other considerations, such as, selection of user-specific options. In particular, users or client devices may set user or client specific options including when, whether, or how to send statuses with routes. For example, a user may specify not to send status related to weather but to send status related to traffic congestion.

If the host 210 determines a status should not be sent with the route, the host 210 sends the route to the client device 232 (650), and the client device 232 enables the user to perceive the route (660). If the host 210 determines a status should be sent with the route, the host 210 sends the route and the status of the one or more features to the client device 232 (670), and the client device 232 enables the user to perceive the route and the status of the one or more features (680).

Figure 7A:
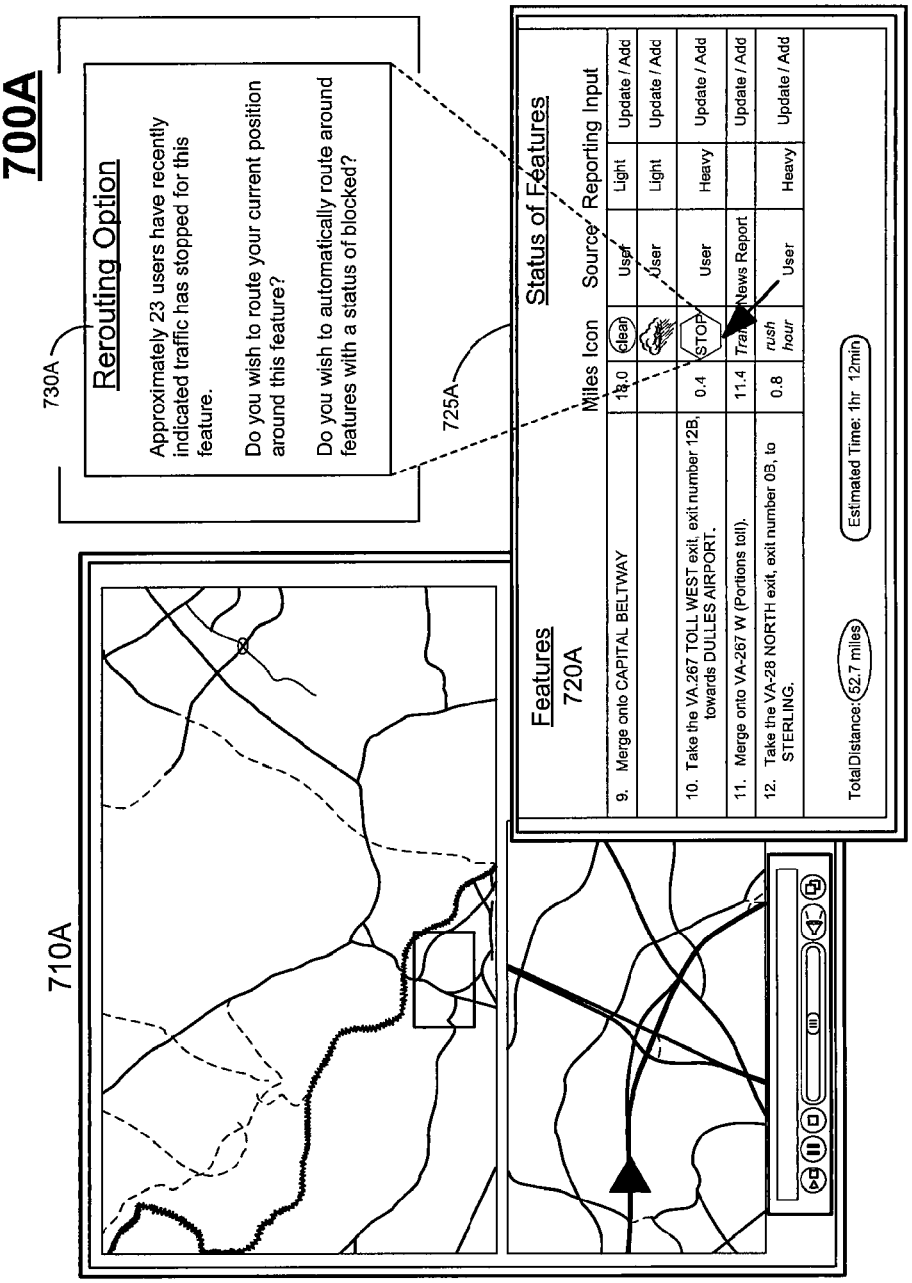
FIGS. 7A-7B are additional exemplary graphical user interfaces including condition information.
Figure 7B:
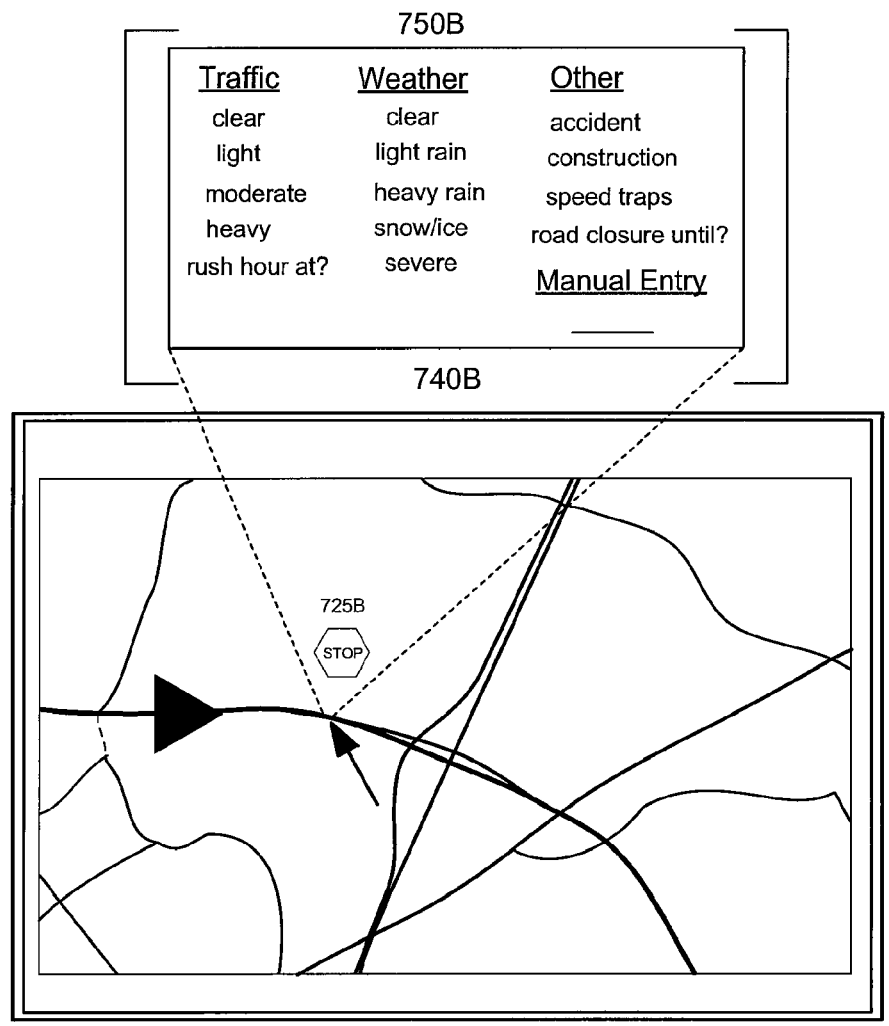

Enabling the user to perceive the status of the one more features may include enabling additional features as shown in the exemplary GUIs 700A of FIG. 7A and 700B of FIG. 7B. Referring to the GUI 700A of FIG. 7A, the user may request a route be recalculated based on the icon 725A corresponding to the received status in step 680. The rerouting option 730A may detail specific information regarding the reporting of the status information, and may enable a user to set future preferences which may automatically be taken into account in the processing of steps 630 and 640. Referring to the GUI 700B of FIG. 7B, the client device 232 may enable a user to interact with features on a map 740B to view an icon 725B corresponding to the status of a feature or to update the status through inputting condition information for the feature. For example, a user may be enabled to click on a location or a features on the rendered map 740A, and as a result of the click, an icon list 750B corresponding to a feature is rendered for user input of condition information.

While FIGS. 7A and 7B are described with respect to the process 600 of FIG. 6, this context is only an example implementation. The GUIs 600A and 600B may be, for example, rendered to a user at a computer outside of the context of requesting a route. For example, a user at a desktop may be rendered the map 740B. After clicking on a feature of the map 740B, the icon list 750B may be rendered. The user may select predictive information, such as an icon relating to rush hour times, and the user may then enter condition information specifying the prediction as to when rush hour occurs for the selected feature. The condition information specifying the prediction as to when rush hour occurs for the selected feature may result in status information for features being rendered to users of desktop computers as well as to users traversing routes as described with processes 400 and 600 of FIGS. 4 and 6.

Referring to FIGS. 8A-8B, the flow charts illustrate examples of sub-processes 800A and 800B which access condition information or statuses after determining features in a route. More specifically, the sub-processes 800A and 800B exemplifies a situation where the host 210 determines features to be included in the route, and based on the determined features, selectively accesses the status or condition information of the determined features. The sub-processes 800A and 800B are two implementations of the process 600 described with respect to FIG. 6.

As shown, sub-process 800A accesses statuses whereas sub-process 800B accesses condition information for a determined route. The method of accessing status information as illustrated by FIG. 8A may enable greater efficiency as a single status may be calculated for all users. The single status may be accessed when necessary (e.g., when the feature corresponding to the status is determined to be in a route). In contrast, the method of accessing condition information as illustrated in FIG. 8B may enable greater flexibility in that statuses may be selectively determined for each user. For example, if a user specifies that they wish to only have condition information from a list of buddies to be considered when determining their status (e.g., as a user-specific status generation rule), the system can access only the stored condition information from the specified users for the features determined to be in a route.

Referring to FIG. 8A, the sub-process begins after the host 210 receives the request for a route (620). The host 210 determines the features to be included in the route (825A). After determining the features to be included, the host 210 determines whether any stored statuses are available for the features to be included in the route (830A). If the host 210 determines that no statuses are available for the features to be included in the route, the host 210 sends the route to the client device 232 (650). If the host 210 determines that stored statuses are available for the features to be included in the route, the host 210 determines whether a status of one or more features should be sent with the route (840A). As discussed above with respect to FIG. 6, determining whether a status of one or more features should be sent may consist of determining whether a status is available or may include various considerations, such as, for example, whether a user has selected options specifying that they do not wish to be sent. If the host 210 determines a status should not be sent with the route, the host 210 sends the route to the client device 232 (650). If the host 210 determines a status should be sent with the route, the host 210 sends the route and the status of the one or more features to the client device 232 (670).

Referring to FIG. 8B, the sub-process begins after the host 210 receives the request for a route (620). The host 210 determines the features to be included in the route (825B).

After determining the features to be included, the host 210 determines whether any condition information is available for the features to be included in the route (830B). If the host 210 determines that no condition information is available for the features to be included in the route, the host 210 sends the route to the client device 232 (650). If the host 210 determines that condition information is available for the features to be included in the route, the host then determines whether a status should be generated and sent along with the second route (840B). As discussed above, determining whether the status should be generated or sent may include consideration of status generation rules or user selected options. If the host 210 determines that the status should not be generated or sent, the host 210 sends the route to the client device 232 (650). If the host determines that the status should be generated and sent, the host 210 then sends the route and the status of the one or more features to the client device 232 (670).

Referring to FIGS. 9A-9B, the flow charts illustrate examples of sub-processes 900A and 900B which access condition information or statuses before determining features in a route. More specifically, the sub-processes 900A and 900B exemplifies a situation where the host 210 considers available condition information or status when determine whether features are to be included in a route. The sub-processes 900A and 900B are two implementations of the process 600 described with respect to FIG. 6.

Referring to FIG. 9A, the sub-process 900A begins after the host 210 receives the request for a route (620). The host 210 accesses stored status of one or more elements to be considered for the route (930A), and based at least in part on the statuses, determines the route (935A). Accessing the stored status may include accessing a stored indication of the status when processing routing algorithms. In one implementation, accessing the stored status includes accessing a stored status database and global or user-specific route generation rules. For example, in one implementation employing cost-based routing, accessing the stored statuses may include accessing indications of routing cost corresponding to statuses and a cost-altering route generation rule. Specifically, the cost-altering route generation rule specifies that a cost associated with traversing a feature may be increased if a feature corresponds to certain stored statuses. For example, for a status of "heavy traffic," the cost-altering route generation rule may double the cost of traversal, thus weighing in the cost algorithm against feature selection. Based on the accessed statuses and the determined route, the host 210 determines whether a status of one or more features should be sent with the route (940A). If the host 210 determines a status should not be sent with the route, the host 210 sends the route to the client device 232 (650). If the host 210 determines a status should be sent with the route, the host 210 sends the route and the status of the one or more features to the client device 232 (670).

Referring to FIG. 9B, the sub-process 900B begins after the host 210 receives the request for a route (620). The host 210 accesses stored condition information for one or more features to be considered for the route (930B), and based at least in part on the condition information, determines the route (935B). Accessing the stored condition information may include accessing and considering cost information as discussed above with respect to FIG. 9A. Based on the accessed condition information, the host 210 then determines whether a status should be generated and sent along with the route (940B). If the host 210 determines a status should not be sent with the route, the host 210 sends the route to the client device 232 (650). If the host 210 determines a status should be sent with the route, the host 210 sends the route and the status of the one or more features to the client device 232 (670).

A number of embodiments have been described. Nevertheless, it will be understood that various modifications may be made without departing from the spirit and scope of the application.

What is claimed is:

1. A computer-implemented method for enabling a user to perceive map or route information based on previous user input of conditions of features, the method comprising:
   receiving, from a first user at a client device on a network, a request for a first route;
   responsive to the request, determining the first route as having a plurality of features associated therewith;
   enabling the client device to display the first route, including the plurality of features, to the first user;
   receiving input from the first user, the input including:
   selecting at least one of the plurality of features of the displayed first route; and
   specifying a condition of the selected at least one feature of the first route;
   determining, based on the condition of the selected at least one feature input by the first user and on condition information received from sources other than the first user, a status of the selected at least one feature of the first route;
   storing the determined status of the selected at least one feature of the first route;
   receiving, from a second user, a request for a second route, the second route comprising a plurality of features including the selected at least one feature of the first route;
   accessing the stored status of the selected at least one feature of the first route; and
   enabling the second user to perceive the second route and the accessed status of the selected at least one feature of the first route.

2. A computer-implemented method for enabling a user to perceive map or route information including a status, the method comprising:
   enabling a client device associated with a first user to perceive features of a map;
   receiving input from the first user, the input including:
   selecting one or more features of the map; and
   specifying a condition of the selected one or more features perceived by the first user as existing at the selected one or more features;
   receiving, from a second user, a request for a route;
   in response to the request from the second user:
   determining, based on the condition of the selected one or more features input by the first user, a response to the request for the route, the response including the route; and
   enabling the second user to perceive the route.

3. The method of claim 2 wherein:
   determining the response to the request for the route includes determining the route and a status of features associated with the route; and
   enabling the second user to perceive the route includes enabling the second user to perceive the route and the status of the route.

4. The method of claim 3 wherein receiving input specifying a condition includes receiving information indicating an amount of traffic that will traverse a portion of a road or an intersection at a future time.

5. The method of claim 3 wherein receiving input specifying a condition includes receiving information indicating an amount of traffic currently traversing a portion of a road or an intersection.

6. The method of claim 3 wherein receiving input specifying a condition includes receiving an update from the first user of an amount of traffic currently traversing a portion of a road or an intersection previously communicated to the first user.

7. The method of claim 3 wherein enabling the second user to perceive the route and the status of the route includes enabling the second user to perceive an indication of the source of the input specifying the condition of the selected one or more features used in determining the response to the request for the route.

8. The method of claim 3 wherein enabling the second user to perceive the route and the status of the route includes enabling the second user to perceive an indication of an amount of users that provided input specifying the condition of the selected one or more features used in determining the response to the request for the route.

9. The method of claim 3 wherein enabling the second user to perceive the route and the status of the route includes enabling the second user to perceive one or more icons as associated with the features, each icon indicating a particular status.

10. The method of claim 2 wherein:
    determining the response to the request for the route includes determining a status of the selected one or more features in response to and after receiving the request for the route; and
    enabling the second user to perceive the route includes enabling the second user to perceive the route including the selected one or more features and the determined status of the selected one or more features.

11. The method of claim 10 wherein determining a status of the selected one or more features in response to and after receiving the request for the route includes:
    determining that the route includes the selected one or more features; and
    using the input condition of the selected one or more features to determine a status of the selected one or more features based on the determination that the route includes the selected one or more features.

12. The method of claim 2 wherein:
    determining the response to the request for the route includes determining a status of the selected one or more features before receiving the request for the route and accessing the determined status of the selected one or more features in response to receiving the request for the route; and
    enabling the second user to perceive the route includes enabling the second user to perceive the route including the selected one or more features and the determined status of the first feature.

13. The method of claim 12 wherein determining a status of the selected one or more features before receiving the request for the route includes using the input condition of the selected one or more features to determine a status of the selected one or more features and storing the determined status of the selected one or more features, the method further comprising:
    determining that the route includes the selected one or more features; and
    accessing, based on the determination that the route includes the selected one or more features, the stored status of selected one or more features.

14. The method of claim 13 further comprising determining whether the second user should be enabled to perceive the stored status of the selected one or more features.

15. The method of claim 14 wherein determining whether the first user should be enabled to perceive the stored status of the selected one or more features includes use of user-specific rules.

16. The method of claim 15 further comprising enabling the second user to specify options which affect the user-specific rules.

17. The method of claim 2 wherein determining the response to the request for the route includes determining whether to include the selected one or more features within the route based on the condition of the selected one or more features input the first user.

18. A system for enabling a user to perceive map or route information including a status, the system comprising:
    a communications module configured to:
        enable a first user to perceive a map having features,
        receive input from the first user, the input including:
            selecting one or more features of the map; and
            specifying a condition of the selected one or more features perceived by the first user as existing relative to the one or more features,
        receive, from a second user, a request for a route, and responsive to the request, enable the second user to perceive the route; and
    a processing module configured to determine, based on the condition of the selected one or more features input by the first user, the response to the request for the route, the response including the route.

19. The system of claim 18 wherein:
    the processing module is further configured to determine the route and a status of features associated with the route; and
    the communications module is further configured to enable the second user to perceive the route and the status of the route.

20. The system of claim 19 wherein the communications module is further configured to receive, as the input condition of the selected one or more features, input from the first user indicating an amount of traffic currently traversing a portion of a road or an intersection.

21. The system of claim 19 wherein the communications module is further configured to receive, as the input condition of the selected one or more features, input from the first user of information reflective of a prediction of an amount of traffic that will traverse a portion of a road or an intersection at a future time.

22. The system of claim 19 wherein the communications module is further configured to receive, as the input condition of the selected one or more features, input from the first user indicating an update of an amount of traffic currently traversing a portion of a road or an intersection previously communicated to the first user.

23. The system of claim 19 wherein the communication module is further configured to enable the second user to perceive an indication of the source of the input specifying the condition of the selected one or more features used in determining the response to the request for the route.

24. The system of claim 19 wherein the communication module is further configured to enable the second user to perceive an indication of an amount of users that provided input specifying the condition of the selected one or more features used in determining the response to the request for the route.

25. The system of claim 19 wherein the communications module is further configured to enable the second user to perceive one or more icons as associated with features, each icon being associated with a particular status.

26. The system of claim 19 wherein:
the processing module is further configured to determine a status of the selected one or more features in response to and after receiving the request for the route; and
the communications module is further configured to enable the second user to perceive the route including the selected one or more features and the determined status of the selected one or more features.

27. The system of claim 26 wherein the processing module is further configured to:
determine that the route includes the selected one or more features; and
use the received condition information to determine a status of the selected one or more features based on the determination that the route includes the selected one or more features.

28. The system of claim 19 wherein:
the processing module is further configured to determine a status of the selected one or more features before receiving the request for the route and accessing the determined status of the selected one or more features in response to receiving the request for the route; and
the communications module is further configured to enable the second user to perceive the route including the selected one or more features and the determined status of the selected one or more features.

29. The system of claim 19 wherein the processing module is further configured to:
use the received condition of the selected one or more features to determine a status of the selected one or more features;
store the determined status of the selected one or more features;
determine that the route includes the selected one or more features; and
access, based on the determination that the route includes the selected one or more features, the stored status of selected one or more features.

30. The system of claim 29 wherein the processing module is further configured to determine whether the second user should be enabled to perceive the stored status of the selected one or more features.

31. The system of claim 30 wherein the processing module is further configured to determine whether the second user should be enabled to perceive the stored status of the selected one or more features using user-specific rules.

32. The system of claim 31 wherein the communications module is further configured to enable the second user to specify options which affect the user-specific rules.

33. The system of claim 18 wherein the processing module is further configured to determine whether to include the selected one or more features within the route based on the condition of the selected one or more features input by the first user.

34. A computer-implemented method for providing information associated with a route, comprising:
receiving, over a communication network from users at client devices, route requests;
determining, in response to the route requests, routes including sequences of features;
transmitting the routes to the client devices over the network to enable the client devices to display the routes to the users;
receiving, from the client devices over the communication network, input from at least some of the users, the input including:
selecting features of the displayed routes, and
specifying traffic condition information associated with the selected features of the routes;
updating a storage module with the specified traffic condition information for the selected route features;
receiving a route request from a first user at a first client device over the communication network;
determining, in response to the route request, a first route including a first sequence of route features;
retrieving, from the storage module, traffic condition information associated with the first sequence of features in the first route;
transmitting, over the communication network to the first client device, the first route and the retrieved traffic condition information associated with the first sequence of features in the first route, to enable the first client device to display the first route and the traffic condition information associated with the first sequence of features in the first route to the first user.

35. The method of claim 34, further comprising determining the first route based at least in part on traffic condition information stored in the storage module.

36. The method of claim 34, wherein identifying traffic condition information for the first sequence of features includes:
identifying a buddy list associated with the first user;
identifying a user on the buddy list;
retrieving, from the storage module, traffic condition information for the first sequence of features provided by the identified user on the buddy list.

* * * * *